(12) United States Patent
Fox

(10) Patent No.: US 7,150,123 B1
(45) Date of Patent: Dec. 19, 2006

(54) ICE FISHING TACKLE STORAGE APPARATUS

(76) Inventor: Philip F. Fox, 10985 40th Place North, Plymouth, MN (US) 55441

( * ) Notice: Subject to any disclaimer, the term of this patent is extended or adjusted under 35 U.S.C. 154(b) by 644 days.

(21) Appl. No.: 09/502,701

(22) Filed: Feb. 11, 2000

(51) Int. Cl.
A01K 97/00 (2006.01)

(52) U.S. Cl. .................................................. 43/54.1

(58) Field of Classification Search ................ 43/21.2, 43/54.1; 248/96; 211/70.8; D22/147, 148
See application file for complete search history.

(56) References Cited

U.S. PATENT DOCUMENTS

| | | | |
|---|---|---|---|
| 963,285 A | 7/1910 | Fly | |
| 1,174,319 A | 3/1916 | Hipwood | |
| 2,548,328 A | 4/1951 | Thayer | |
| 2,552,879 A | 5/1951 | Woerner | |
| 2,554,650 A | 5/1951 | Waite | |
| 2,731,224 A | 1/1956 | MacDonald | |
| D179,525 S | 1/1957 | Porter | |
| 3,138,891 A | 6/1964 | Gottula | |
| 3,524,572 A | 8/1970 | Hall | |
| 3,603,019 A | 9/1971 | Smeltzer | 43/21.2 |
| 3,674,190 A | 7/1972 | Wright | 224/5 E |
| 3,701,504 A | 10/1972 | Woods et al. | 248/39 |
| 3,964,706 A | 6/1976 | Adams | 43/21.2 |
| 4,014,128 A | 3/1977 | Hrdlicka | 43/21.2 |
| 4,157,804 A | 6/1979 | Byford | 248/512 |
| D261,581 S * | 11/1981 | Buchanan | D22/148 |
| 4,306,601 A | 12/1981 | Wallis et al. | 150/52 R |
| 4,311,262 A * | 1/1982 | Morin | 294/141 |
| 4,353,182 A | 10/1982 | Junkas et al. | 43/54.5 R |
| 4,436,340 A | 3/1984 | Hernandez | 297/193 |
| 4,485,579 A | 12/1984 | Hawie | 43/21.2 |
| 4,650,146 A | 3/1987 | Duke | 248/512 |
| 4,778,141 A | 10/1988 | Bogar | 248/538 |
| 4,782,624 A * | 11/1988 | Head | 43/21.2 |
| 4,827,658 A * | 5/1989 | Wolniak | 43/54.1 |
| 4,871,099 A * | 10/1989 | Bogar, Jr. | 224/42.45 |
| 4,953,318 A * | 9/1990 | Vasseur, Jr. | 43/21.2 |
| 5,025,584 A | 6/1991 | Butterwick, Sr. | 43/21.2 |
| 5,044,109 A | 9/1991 | Fast | 43/21.2 |
| 5,054,229 A | 10/1991 | Hughes | 43/21.2 |
| 5,072,539 A * | 12/1991 | Greenberg | 43/21.2 |
| 5,125,615 A | 6/1992 | McGuire | 248/512 |
| 5,131,179 A * | 7/1992 | McEwen | 43/21.2 |
| 5,152,494 A | 10/1992 | Frunzar | 248/513 |
| 5,159,777 A * | 11/1992 | Gonzalez | 43/54.1 |
| 5,275,316 A | 1/1994 | Kish | 224/210 |
| 5,335,440 A | 8/1994 | Williams | 43/21.2 |
| 5,337,892 A * | 8/1994 | Zaffina | 206/315.11 |
| 5,358,109 A * | 10/1994 | Nichols | 206/315.3 |
| 5,437,122 A | 8/1995 | Wilson | 43/21.2 |
| 5,471,779 A | 12/1995 | Downey | 43/54.1 |
| 5,491,923 A | 2/1996 | Zingrone | 43/17 |
| 5,511,336 A | 4/1996 | Bishop | 43/22.2 |
| 5,533,295 A | 7/1996 | Hochberger | 43/21.2 |
| 5,544,797 A | 8/1996 | Silva | 224/311 |

(Continued)

Primary Examiner—Kurt Rowan
(74) Attorney, Agent, or Firm—Philip F. Fox (57) ABSTRACT

An ice fishing tackle storage apparatus that includes a pair of elongate shells, the elongate shells each having an interior surface that defines an elongate cavity, and ice fishing tackle capable of being positioned within the elongate cavity of each elongate shell, a first spacing component, the pair of elongate shells each secured by the first spacing component, and a second spacing component, the at least one of the elongate shells secured by the second spacing component, the second spacing component spaced apart from the first spacing component.

43 Claims, 5 Drawing Sheets

U.S. PATENT DOCUMENTS

| | | | | |
|---|---|---|---|---|
| 5,573,122 A | * | 11/1996 | Williams | 211/70.2 |
| 5,595,429 A | | 1/1997 | Kennedy | 312/235.2 |
| 5,607,053 A | * | 3/1997 | Sumiyoshi | 206/315.2 |
| D384,391 S | * | 9/1997 | Bastian | D22/148 |
| 5,678,348 A | * | 10/1997 | Zielinski et al. | 43/26 |
| 5,685,107 A | | 11/1997 | Sweet | 43/21.2 |
| 5,797,212 A | | 8/1998 | Kistner et al. | 43/21.2 |
| 5,813,164 A | | 9/1998 | Liberto | 43/21.2 |
| 5,937,567 A | | 8/1999 | Elkins | 43/21.2 |
| 5,956,883 A | | 9/1999 | Krouth et al. | 43/21.2 |
| 5,967,315 A | * | 10/1999 | Langtry, II | 206/315.11 |
| 5,975,479 A | | 11/1999 | Suter | 248/534 |
| 5,992,081 A | | 11/1999 | Elkins | 43/21.2 |
| 6,076,298 A | | 6/2000 | Teel | 43/54.1 |
| 6,185,860 B1 | * | 2/2001 | Thibodeaux | 43/54.1 |

* cited by examiner

ICE FISHING TACKLE STORAGE APPARATUS

CROSS-REFERENCE TO RELATED APPLICATION(S)

None

BACKGROUND OF THE INVENTION

The present invention generally relates to an apparatus for storing ice fishing equipment. More specifically, the present invention relates to an apparatus for storing ice fishing tackle, such as ice fishing rods and tip-ups that are commonly used in ice fishing.

In northern portions of the United States, many lakes freeze and accumulate up to two or three feet of ice, or more, during the winter time. This ice layer does not deter fishermen. Instead, ice fishing is a very popular sport in northern climates, where ice fishermen auger holes in the ice to fish through the ice. Indeed, entire villages of ice fishing shanties accumulate on some of the more popular frozen lakes.

Ice fishing rods are generally much shorter in length than rods that are used to fish in open water. Typically, ice fishing rods range in length from about one foot, or so, up to about two and a half or three feet, or so, in length. Besides ice fishing rods, many ice fishermen also use a device that is known as a "tip-up". A "tip-up" typically includes a base or a frame and a reel or reel-type device that is mounted thereon for holding fishing line. The name "tip-up" comes from the movement of a flag or arm that is tripped when a fish grabs the lure or hook and consequently causes movement of the reel. This movement of the reel trips the flag or arm and causes the flag or arm to "tip-up." When the flag or arm tips up, this notifies the fisherman that a fish has grabbed the lure or hook.

Ice fishermen commonly store their ice fishing rods and/or tip-ups in plastic pails or buckets. These pails or buckets typically range in size from about three gallons, or so, up to about five gallons or more. Such use of these pails keeps all of the ice fishermen's fishing rods and/or tip-ups within easy reach and offers a convenient method of carrying multiple ice fishing rods and/or tip-ups on frozen lakes when going ice fishing. Ice fishermen typically keep several different pre-rigged ice fishing rods and/or tip-ups in their pails. These rods and tip-ups are pre-rigged with artificial lures or with hooks and bobbers because the cold temperatures commonly found when ice fishing are not conducive to easy rigging after one is out on the frozen lake. Some ice fishermen may have as many as six, eight, or even ten pre-rigged ice fishing rods to allow selection of the appropriate pre-rigged rod when fishing for different species and when fishing at different depths, different locations, or different structure of the lake.

While the commonly used pail offers a convenient way to transport these multiple ice fishing rods and/or tip-ups, these pails also create another set of problems. Specifically, hooks, lures, and fishing line on adjacent pre-rigged ice fishing rods and/or tip-ups frequently become tangled with each other in the pail. These entanglements make it difficult to quickly switch between different rods especially when temperatures are cold and patience is running low.

Ice fishermen need a more convenient way of carrying pre-rigged ice fishing rods and tip-ups that makes it easy to retrieve a particular pre-rigged ice fishing rod or tip-up while also avoiding the problem of different pre-rigged rods and/or tip-ups becoming entangled with each other. The present invention offers a simple, yet effective, apparatus and technique that solves this problem, while allowing ice fishermen to continue using conventional plastic pails for carrying their pre-rigged ice fishing rods and/or tip-ups.

BRIEF SUMMARY OF THE INVENTION

The present invention relates to an ice fishing tackle storage apparatus. The ice fishing tackle storage apparatus includes a pair of elongate shells, a first spacing component, and a second spacing component. The pair of elongate shells each have an interior surface that defines an elongate cavity. Ice fishing tackle is capable of being positioned within the elongate cavity of each elongate shell. The pair of elongate shells are each secured by the first spacing component, and the second spacing component secures at least one of the elongate shells. The second spacing component is spaced apart from the first spacing component.

DETAILED DESCRIPTION

The present invention generally relates to an apparatus for storing ice fishing equipment. More specifically, the present invention relates to an apparatus for storing ice fishing tackle, such as ice fishing rods and/or tip-ups that are typically used by ice fishermen when fishing on frozen lakes.

Figure 1:
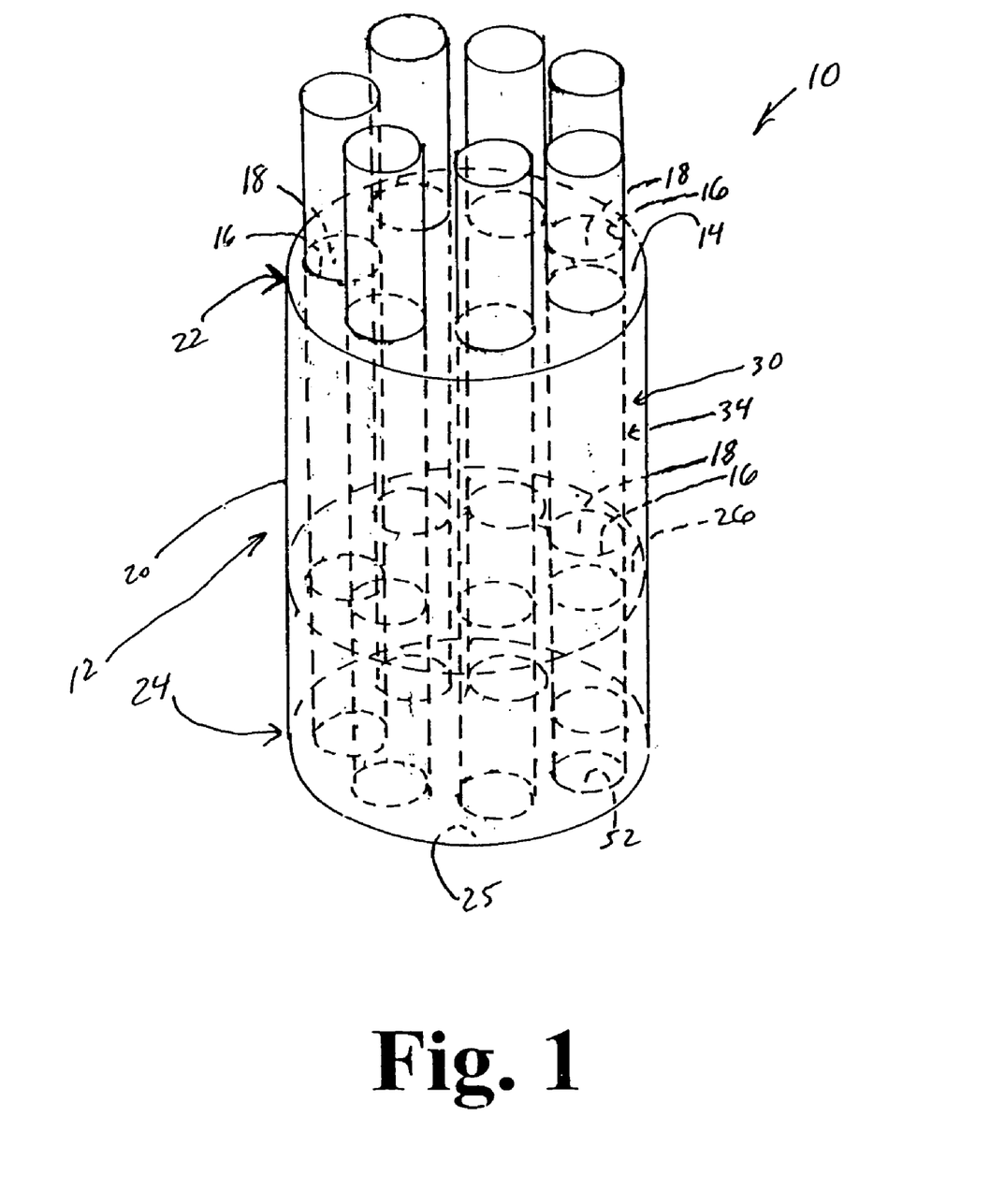
FIG. 1 is a perspective view depicting an ice fishing tackle storage apparatus of the present invention.

An apparatus for storing ice fishing rods in accordance with the present invention is generally depicted at 10 in FIG. 1. The apparatus 10 may be placed in a container 12, such as a plastic pail or bucket with a capacity ranging from about three gallons to about five gallons, or even more. Alternatively, the apparatus 10 may be used alone without placing the apparatus 10 in the container 12.

Figure 2:
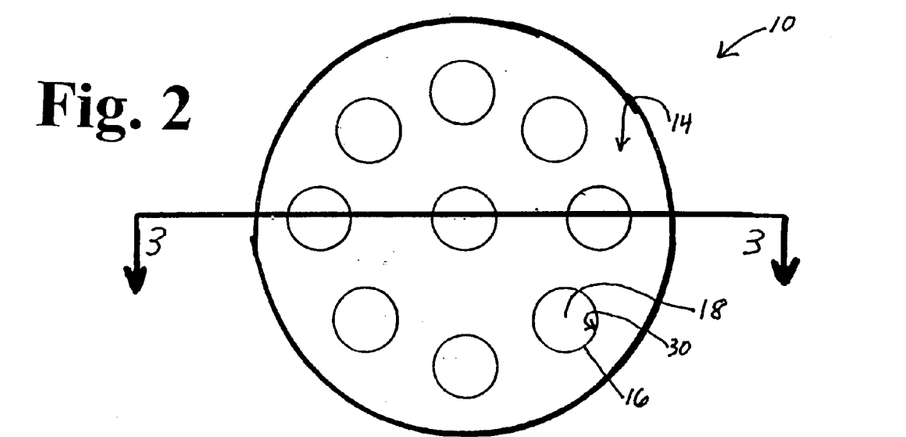
FIG. 2 is a top plan view depicting an ice fishing tackle storage apparatus of the present invention.

The apparatus 10 may include a spacing structure, such as a template 14. If the apparatus 10 is to be used in combination with the container 12, the template 14 may be configured to rest on the container 12 or, alternatively, may be configured to be positioned within the container 12. The template 14, as depicted in FIG. 2, includes a plurality of interior surfaces 16. The interior surfaces 16 of the template define apertures 18 through the template 14.

Figure 3:
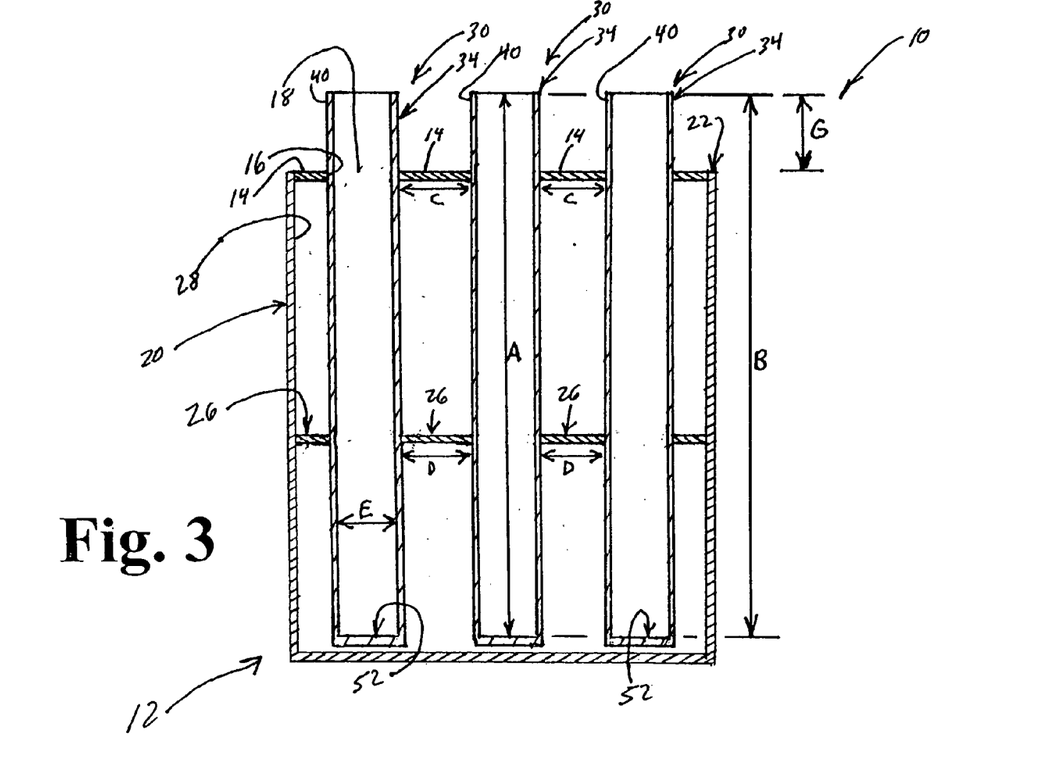
FIG. 3 is a sectional view of the ice fishing tackle storage apparatus depicted in FIG. 2, taken through line 3—3.

As best depicted in FIG. 3, the container 12 includes an exterior wall 20. The exterior wall 20 has both a proximal end 22 and a distal end 24. Also, the container 12 will typically include a bottom wall 25 that is attached to the exterior wall 20, proximate the distal end 24, to close the opening (not shown) that would otherwise be defined by the exterior wall 20 proximate the distal end 24.

Throughout this document, like elements are referred to using like reference characters.

Besides the template 14, the apparatus 10 may also include another spacing structure, such as a template 26. The template 26, like the template 14, includes a plurality of interior surfaces 16 that define apertures 18 through the template 26. The exterior wall 20 of the container 12 includes an interior surface 28. The template 14 may be positioned either on top of the container 12 and in contact with the proximal end 22 of the exterior wall 20 or alternatively may be inserted within the container 12 and in contact with the interior surface 28 of the exterior wall 20. On the other hand, when the apparatus 10 is to be used in combination with the container 12, the template 26 will typically be inserted within the container 12 and in contact with the interior surface 28.

The apparatus 10 also includes a plurality of elongate shells, such as a plurality of tubes 30. Each elongate shell, or tube 30, has both a distal end 31 and a proximal end 32. Each different tube 30 may be inserted through one aperture 18 of the template 14 and through one aperture 18 of the template 26. Each tube 30 has a longitudinal axis A and a length B. The length B may vary between different tubes 30, to accommodate ice fishing rods with different lengths. Preferably, the apertures 18 of the templates 14, 26 that accommodate a particular tube 30 are aligned with each other so that the axis A of each tube 30 is substantially parallel with the axis A of each of the other tubes 30 of the apparatus 10. Such aperture 18 alignment helps to simplify insertion of the tubes 30 through the apertures 18 of the templates 14, 26. The tubes 30 may be held in place within the apertures 18 by friction only. Alternatively, any conventional attachment technique, such as the use of an adhesive that is compatible to the material of the tubes 30 and to the material of the template 14 and/or the template 26 as appropriate, may be used to secure the tubes 30 within the apertures 18.

When the apparatus 10 is to be used without the container 12, the apparatus 10 is preferably capable of being placed on a surface (not shown), such as the surface of a frozen lake without tipping over. Consequently, when used without the container 12, at least two of the elongate shells, such as at least two of the tubes 30, should have a cross sectional area large enough and should be appropriately spaced apart from each other to serve as legs that will stably support the apparatus 10 on the surface when the at least two elongate shells, or tubes 30, are positioned in contact with the surface. Likewise, in this configuration, the template 14 and/or the template 26 should be attached to the at least two elongate shells, or tubes 30, in a manner that is effective to prevent slippage of the at least two elongate shells with respect to the template 14 and/or the template 26. As another alternative, when used without the container 12, the apparatus 10 may include a plurality of legs (not shown) that are capable of supporting the apparatus 10 on the surface when the legs are positioned in contact with the surface. Any such plurality of legs may be attached to any portion of the apparatus 10, such as to the template 14 and/or the template 26, and/or any of the elongate shells, or tubes 30, that are secured against slippage with respect to the template 14 and/or the template 26.

The apparatus 10 may include both the template 14 and the template 26, only the template 14, or only the template 26. The templates 14, 26 may be positioned anywhere along the length B of the tubes 30. However, when the apparatus 10 is to be used in combination with the container 12, the templates 14, 26 are preferably positioned to extend the tubes 30 as fully into the container 12 as possible, to minimize any tendency for the combination of the apparatus 10 and the container 12 to be "top-heavy." Similar comments apply to the spacing between the template 14 and the template 26, which may permissibly be spaced apart from each other by any distance up to about the length B of the tubes 30.

The decision about whether to use one or both of the templates 14, 26 hinges, at least in part, upon how much potential movement of the proximal ends 32 toward each other is acceptable. Preferably, the apparatus 10 is constructed to minimize potential movement of the proximal ends 32 toward each other. Minimized movement of the proximal ends 32 toward each other is desirable to make it easier to select and retrieve ice fishing tackle from the individual elongate shells, such as individual tubes 30. Use of both the template 14 and the template 26 typically helps to minimize the potential for movement of the proximal ends 32 toward each other, especially when the apparatus 10 is to be used in combination with the container 12. Alternatively, the material used to form the template 14 and/or the template 26, in combination with the thickness of the template 14 and/or the template 26, may be selected to minimize the potential for movement of the proximal ends 32 toward each other. As another alternative, the elongate shells, such as the tubes 30, may be mounted flush with the template 14 to minimize the potential for movement of the proximal ends 32 toward each other.

Though the apertures 18 are depicted as having a circular cross-sectional shape in FIG. 2, it is to be understood that the apertures 18 may have any other cross-sectional shape, such as, for example, rectangular, square, triangular, or elliptical cross-sectional shapes, so long as the elongate shells, such as the tubes 30, are able to fit within the apertures 18. In one preferred form of the apparatus 10, the apertures 18 are sized to secure the elongate shells, such as the tubes 30, in place within the apertures 18, absent selective application of digital pressure to move the tubes 30 along the axis A, relative to the apertures 18. Likewise, though the elongate shells are depicted as tubes 30 having a circular cross-sectional shape, it is to be understood that the elongate shells may have any other cross-sectional shape, such as a rectangular, square, triangular, or elliptical shape, so long as the elongate shells, such as the tubes 30, are able to fit within, and be securely held within, the apertures 18.

The apparatus 10 may be constructed by first forming the spacing structure(s), such as the template 14 and/or the template 26. The templates 14, 26 may be formed by cutting a layer of material in an appropriate pattern to fit on top of (on the proximal end 22 of the exterior wall 20 of) the container 12 and/or to fit within the container 12, as desired. When the apparatus 10 will not be used in combination with the container 12, the exact pattern of the layer of material being used to form the template 14 and/or the template 26 is less critical, so long as the sufficient space is provided to accommodate the apertures 18 in the desired pattern. The apertures 18 may be created in the layer of material that is used to form the templates 14, 26 using any conventional hole or bore formation technique, such as drilling, for example.

Next, the elongate shells, such as the tubes 30, may be inserted through the apertures 18 of the template 14 and/or the template 26 to form the apparatus 10. Alternatively, the template 14 and/or the template 26 may be fitted to the container 12 prior to inserting the tubes 30 through the apertures 18 of the pre-installed template 14 and/or the pre-installed template 26.

When manufactured in this way, the templates 14, 26 are preferably formed of any appropriate material that is rigid enough, at the selected material thickness, to maintain a predetermined spacing C between different apertures 18 of the template 14 and a predetermined spacing D between different apertures 18 of the template 26. Some examples of suitable materials for the templates 14, 26 are plastics, such as polyvinyl chloride, polyethylene, polystyrene, and nylon; metal, such as aluminum or steel; and wood. The tubes 30 are preferably formed of a material that will hold its shape during use. Additionally, the material used for the tubes 30 should not damage ice fishing rods or tip-ups during storage and transportation in the apparatus 10. Plastics, such as polyvinyl chloride, polyethylene, and nylon, are some examples of suitable materials for the tubes 30.

Despite this focus on rigidity, the templates 14, 26 may be alternatively be formed of thinner or more flexible material that is not necessarily effective to maintain the predetermined spacing C between different apertures 18 of the template 14 and the predetermined spacing D between different apertures 18 of the template 26. This ability to alternatively rely on thinner or more flexible material for the templates 14, 26 derives from the observation that the elongate shells, or tubes 30, will typically be effective to prevent entanglement of ice fishing tackle located in adjacent elongate shells or tubes 30, regardless of movement of adjacent tubes 30 toward each other. Nonetheless, selection of a material for the templates 14, 26 that will be effective to maintain the predetermined spacing C between different apertures 18 of the template 14 and the predetermined spacing D between different apertures 18 of the template 26 is preferred, since such formation of the templates 14, 26 will tend to minimize the opportunity for movement of the proximal ends 32 of the tubes 30 toward each other. As stated previously, minimized potential for movement of the proximal ends 32 toward each other is desirable to make it easier to select and retrieve ice fishing tackle from the individual elongate shells, such as individual tubes 30.

As another alternative, the templates 14, 26 may be pre-formed to have the apertures 30, and may in fact be formed about the tubes 30, using any conventional plastic formation technique, such as injection molding. Furthermore, the templates 14, 26 and the tubes 30 may each be molded as a unit in the form of the apparatus 10, using conventional plastic formation techniques, such as injection molding.

Figure 4:
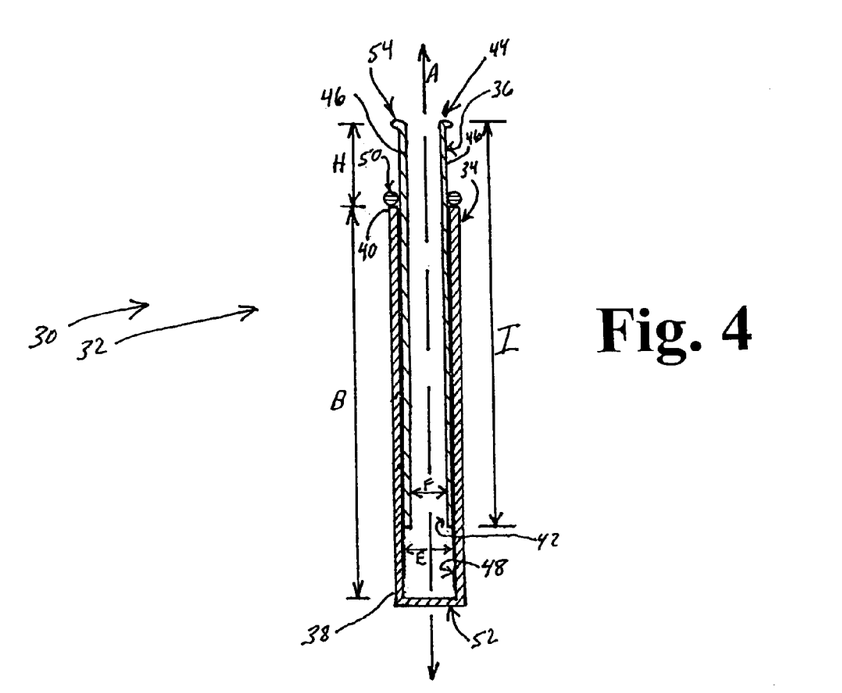
FIG. 4 is a sectional view of an extendable elongate shell of the ice fishing tackle storage apparatus of the present invention.

As best depicted in FIG. 4, one or more of the elongate shells, such as one or more of the tubes 30, may take the form of an adjustable elongate shell, such as an adjustable tube 33. The adjustable tube 33, as one non-exhaustive example, may include a female tube 34 and a male tube 36 that fits within and slides within the female tube 34. The female tube 34 has a distal end 38 and a proximal end 40, and the male tube 36 has a distal end 42 and a proximal end 44. The male tube 36 includes an exterior surface 46 and the female tube 34 includes an interior surface 48. The male tube 36 is inserted into the female tube 34, preferably with the exterior surface 46 of the male tube 36 in slidable contact with the interior surface 48 of the female tube 34. The adjustable tube 32 preferably includes a stop 50, such as a plastic or rubber washer or equivalent thereof, that is ordinarily in fixed contact with the exterior surface 46 of the male tube 36. However, the stop 50 should be capable of being selectively and slidably adjusted along the exterior surface 46, from near the distal end 42 to near the proximal end 44 of the male tube 36, with application of finger pressure. In use, the stop 50 rests against the proximal end 40 of the female tube 34 and thereby sets the position of the male tube 36 within the female tube 34. The ability to adjust the position of the stop 50 along the male tube 36 permits adjustment of the male tube 36 along the longitudinal axis A, relative to the female tube 34.

Both the distal end 42 and the proximal end 44 of the male tube 36 are open, and the proximal end 40 of the female tube 34 is open. However, the distal end 38 of the female tube 34 may either be open or, alternatively, may be closed by a bottom 52. The female tube 34 may optionally be perforated to prevent moisture from building up within the female tube 34. When the female tube 34 is used alone as the tube 30, the female tube 34 should have an inner diameter E that is large enough to accept the ice fishing rod, including any ferrules and attached lures or bobbers, or the tip-up. When the adjustable tube 33 is used as the tube 30, the male tube 36 should have an internal diameter F that is large enough to accept the tip-up or the ice fishing rod, including any ferrules and attached lures or bobbers.

In practice, when the female tube 34, instead of the adjustable tube 33, serves as the tube 30, a pre-rigged tip-up 53a or the tip of a pre-rigged ice fishing rod 53b maybe inserted into any of the female tubes 34 at the proximal end 40, as best depicted in FIG. 3. As used herein, the "tip" of the ice fishing rod 53b refers to the end of the ice fishing rod 53b opposite the handle end of the ice fishing rod 53b. Typically, one ferrule is located at the tip of the ice fishing rod 53b and any remaining ferrules are spaced along the rod from the tip back toward a reel or line windup 53c. The length B of the female tube 34 is adequate to permit the ice fishing rod 53b to slide into the female tube 34 until the reel or line windup 53c that is attached to the ice fishing rod 53b comes into contact with the proximal end 40 of the female tube 34. Depending upon the positioning of the template 14 along the length B of the tubes 30, this may cause any particular one of the female tubes 34 to extend by a distance G above the template 14. Each of the tubes 30, such as the female tubes 34, may have a different length B or may have the same length B.

Alternatively, when the adjustable shell, such as the adjustable tube 33, is used as the elongate shell, such as the tube 30, as best depicted in FIG. 4, the tip of the ice fishing rod (not shown) is inserted into the male tube 36 at the proximal end 44. The ice fishing rod is inserted until the reel or line windup that is attached to the rod comes into contact with the proximal end 44 of the male tube 36. If needed, the stop 50 may be adjusted along the male tube 36 to change a distance H by which the proximal end 44 of the male tube 36 extends above the proximal end 40 of the female tube 34. Such an adjustment will assure that the reel or line windup rests against the proximal end 44 to avoid causing the weight of the rod to be supported by contact between the tip of the rod with either the bottom surface 52 of the female tube 34, the bottom wall 25 (not shown in FIG. 4) of the container 12, if the bottom 52 is excluded from the female tube 34, or the surface supporting the apparatus 10, if the container 12 is not used. Preferably, the male tube 36 has a length I that is about the same as, or less than, the length B of the female tube 34 to permit full retraction of the male tube 36 into the female tube 34 when the distance from the tip of the particular ice fishing rod to the reel or line windup that is attached to the ice fishing rod is less than the length B of the female tube 34.

The proximal end 44 of the male tube 36 preferably includes a rounded surface 54, since fishing line extending from the reel or from the line windup to the tip of the ice fishing rod may sometimes be in contact with the proximal end 44 of the male tube 36, depending upon the particular style of the reel or line windup being used. The rounded surface 54 should be smooth and adequate to minimize, and preferably eliminate, abrasion of any fishing line that rests against the proximal end 44 of male tube 36. Though not depicted, the female tube 34, when used without the male tube 36 as the tube 30, preferably also includes a rounded surface (not shown) at the proximal end 40 of the female tube 34 to similarly prevent abrasion of any line coming into contact with the proximal end 40 of the female tube 34.

Figure 5:
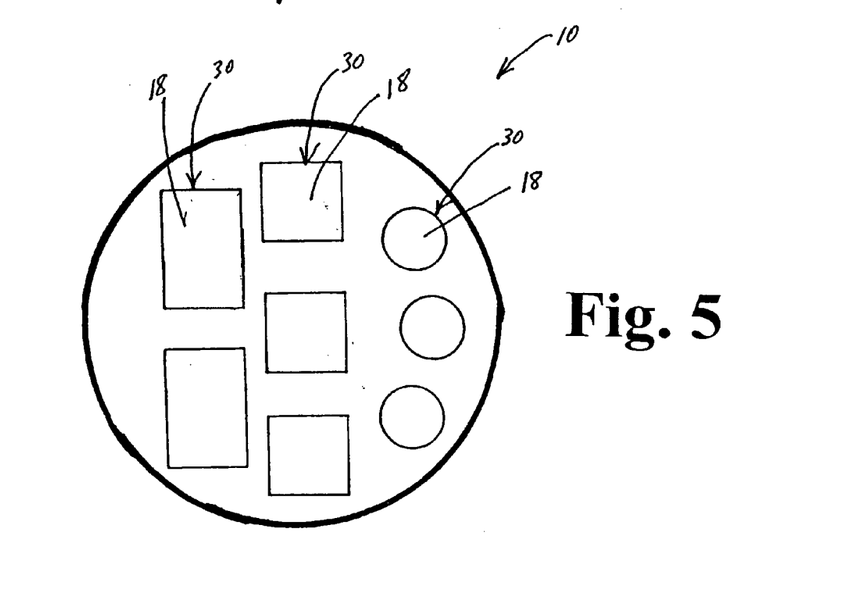
FIG. 5 is a top plan view depicting another ice fishing tackle storage apparatus of the present invention.

Besides having a round cross-section, any of the apertures 18 may, as best depicted in FIG. 5, have different shapes, such as a rectangular or a square cross-section. Furthermore, in a particular template 14 and any corresponding template 26 (not shown in FIG. 5), different apertures 18 may have different cross-sectional shapes. Indeed, the templates 14, 26 may include apertures 18 with any combination of different shapes. For example, the cross-sectional shapes of the apertures 18 in the templates 14, 26 may be selected from circular, elliptical, square, rectangular, triangular, and any combination of these different cross-sectional shapes. Likewise, the elongate shells, such as the tubes 30, that are inserted into the apertures 18 may have any cross-sectional shape and/or size that is adequate to fill the apertures 18 and secure the tubes 30 in the apertures 18. Typically, a circular cross-section is adequate for the aperture 18 and the corresponding tube 30 when the ice fishing equipment to be stored in a particular tube 30 is an ice fishing rod. On the other hand, square or even rectangular cross-section shapes may be needed for apertures 18 and corresponding tubes 30 to accommodate tip-ups.

Figure 6:
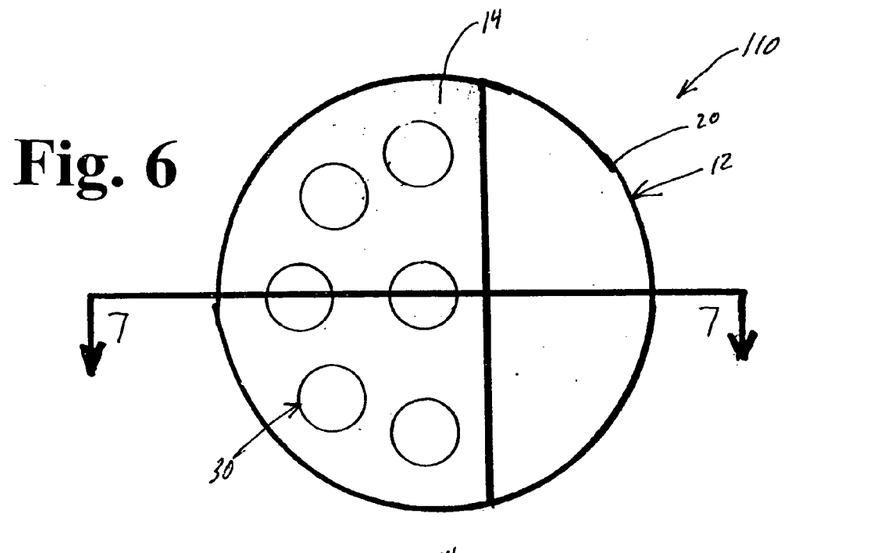
FIG. 6 is a top plan view depicting another ice fishing tackle storage apparatus of the present invention.
Figure 7:
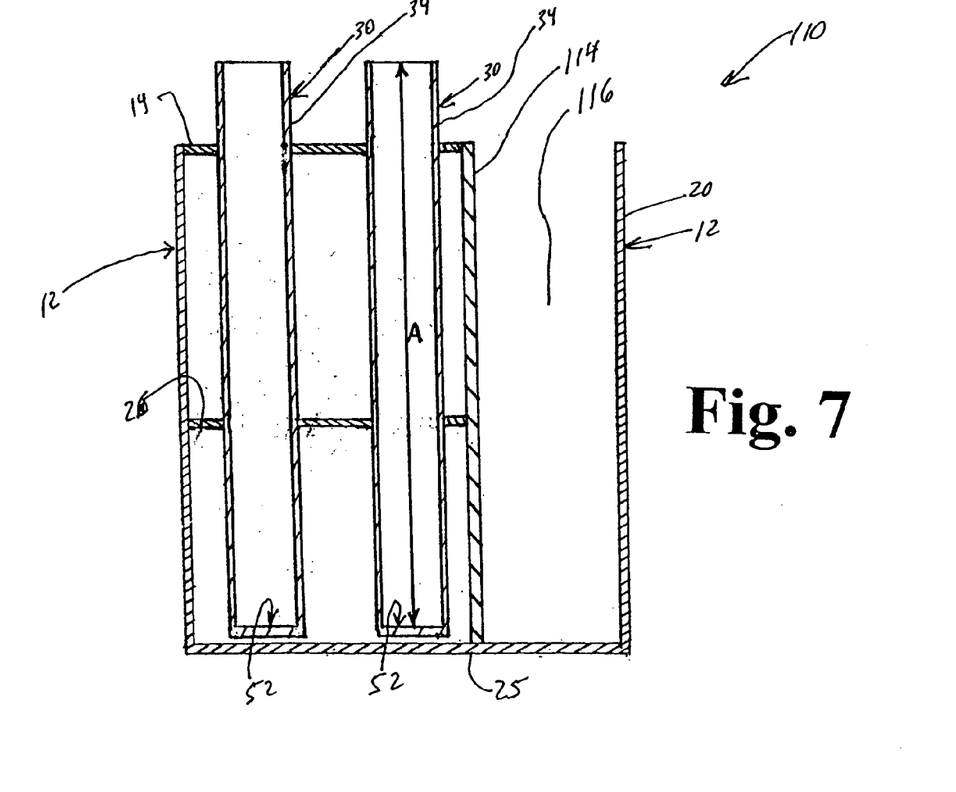
FIG. 7 is a sectional view of the ice fishing tackle storage apparatus depicted in FIG. 6, taken through line 7—7.

An alternative ice fishing tackle storage apparatus of the present invention is generally depicted at 110 in FIG. 6. In the apparatus 110, the template 14 covers only a portion of the opening defined by the proximal end 22 of the exterior wall 20 of the container 12. As best depicted in FIG. 7, the apparatus 110 may include an optional support wall 114 that links the template 14 to the bottom wall 25 of the container 12. The wall 114 may not be necessary for supporting the template 14 when the template 26 is used, if the frictional force or other attachment mechanism between the tubes 30 and the templates 14, 26 is adequate to prevent slippage of the tubes 30 within the apertures 18 of the templates 14, 26. If the template 26 is not used in the apparatus 110, it will often be useful to incorporate the support wall 114 to help maintain the different tubes 30 in substantially parallel alignment with each other. The optional wall 114 also serves an additional purpose. Specifically, when the wall 114 is included, the wall 114 and portions of the exterior wall 20 that are not covered by, or in contact with any included template 14 and/or template 26, will define a chamber 116 in the apparatus 110. The chamber 116 may be used to store ice fishing equipment that is not susceptible to entanglement and that therefore may be stored together.

Figure 8:
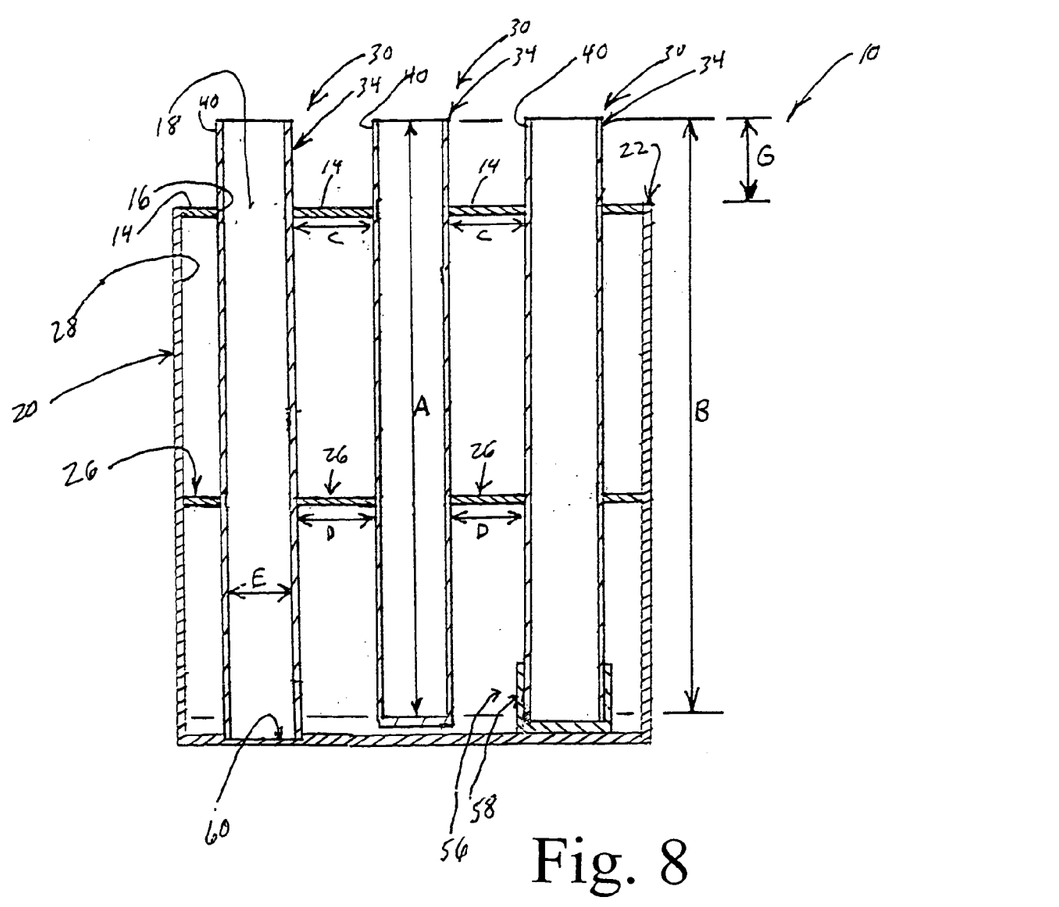
FIG. 8 is another sectional view of the ice fishing tackle storage apparatus depicted in FIG. 3, taken through line 3–3.

As another option, a positioning flange 56, such as a socket 58, that is capable of accepting and securing the distal ends 38 of the tubes 30, as best depicted in FIG. 8, may be fixed to the bottom wall 25 of the container 12, in lieu of the template 26, when the template 14 is used. The flange 56, in combination with the template 14, helps to stabilize and maintain a particular desired alignment between different tubes 30. As another alternative, the templates 14, 26 may each be dispensed with, in favor of positioning flanges 56 or sockets 58 only, by increasing the height of the positioning flanges 56 or sockets 58 to grip more of the length of the tubes 30. As yet another alternative, a recess 60 may be bored or formed in the bottom wall 25 of the container 12 to accept the distal ends 38 of the different tubes 30, in place of using the positioning flanges 56 or the template 26 for purposes of stabilizing the tubes 30.

The apparatus 10, as well as the apparatus 110, of the above-identified application solve a long-standing problem by preventing entanglement of different ice fishing rods and/or tip-ups. The elongate shells, such as the tubes 30, accomplish this feat by physically isolating different ice fishing rods and/or tip-ups from each other. Without such physical isolation that is provided by the elongate shells, such as the tubes 30, in accordance with the present invention, entanglement of ice fishing rods and/or tip-ups may, and in all likelihood, will occur. By adjusting the cross-sectional size and/or shape of the elongate shells, such as the tubes 30, and the corresponding apertures 18, the apparatus 10 and the apparatus 110, along with derivatives thereof that are addressed in this document, may be flexibly used to accommodate both ice fishing rods and/or tip-ups. This is true even if a particular ice fishing rod and/or a particular tip-up is pre-rigged with an artificial lure or with a hook and a bobber. Thus, in addition to preventing entanglement, the ice fishing tackle storage apparatus of the present invention allows the ice fisherman to quickly select and switch between pre-rigged rods and/or tip-ups, without having to worry about untangling the adjacent ice fishing rods and/or tip-ups from each other, either in the cold on the frozen lake or after the fishing trip when the fisherman wishes to attend to more productive matters.

Although the present invention has been described with reference to preferred embodiments, workers skilled in the art will recognize that changes may be made in form and detail without departing from the spirit and scope of the invention.

The invention claimed is:

1. An ice fishing tackle storage apparatus, the apparatus comprising:
    a pair of extendable elongate shells, the extendable elongate shells having an interior surface that defines an elongate cavity, the pair of extendable elongate shells located adjacent to each other, and ice fishing tackle capable of being positioned within the elongate cavity of each extendable elongate shell; and
    a spacing structure, the pair of extendable elongate shells each secured by the spacing structure, the spacing structure effective to maintain the pair of extendable elongate shells in predetermined relation to each other, proximate the spacing structure.

2. The ice fishing tackle storage apparatus of claim 1 wherein the spacing structure comprises a first template, the first template comprising a plurality of interior surfaces, the interior surfaces defining a plurality of apertures that extend through the first template, each extendable elongate shell passing through one of the apertures of the first template.

3. The ice fishing tackle storage apparatus of claim 2 wherein the spacing structure further comprises a second template, the second template comprising one or more interior surfaces, the one or more interior surfaces defining at least one aperture that extends through the second template, one of the extendable elongate shells passing through the aperture of the second template.

4. The ice fishing tackle storage apparatus of claim 1 wherein the ice fishing tackle storage apparatus is positioned in a container, the container having a wall, the wall comprising interior surfaces that define a plurality of recesses in the wall or a plurality of apertures through the wall, the spacing structure comprising the recesses or the apertures of the wall, each extendable elongate shell passing through the apertures of the wall or positioned in the recesses of the wall.

5. The ice fishing tackle storage apparatus of claim 1 wherein the ice fishing tackle storage apparatus is positioned in a container, the container having a wall, the spacing structure comprising a plurality of sockets, the sockets attached to the wall of the container, and the extendable elongate shells positioned in the socket.

6. The ice fishing tackle storage apparatus of claim 1 wherein the ice fishing tackle storage apparatus is positioned in a container, the container having a wall, the wall having a proximal end and a distal end and the wall having an interior surface, the spacing structure either in contact with the proximal end of the wall, in contact with the interior surface of the wall, or in contact with both the proximal end of the wall and the interior surface of the wall.

7. The ice fishing tackle storage apparatus of claim 1 wherein at least one of the extendable elongate shells has a longitudinal axis and comprises a female elongate shell and a male elongate shell that is positioned within the female elongate shell, the male elongate shell selectively movable along the longitudinal axis relative to the female elongate shell or the female elongate shell selectively movable along the longitudinal axis relative to the male elongate shell.

8. The ice fishing tackle storage apparatus of claim 7 wherein the female elongate shell and the male elongate shell are each tubes.

9. The ice fishing tackle storage apparatus of claim 7 wherein the female elongate shell and the male elongate shell each have a cross-sectional shape, the cross-sectional shape selected from the group consisting of cylindrical, square, rectangular, triangular, and elliptical cross-sectional shapes.

10. An ice fishing tackle storage apparatus, the apparatus comprising:
 a pair of elongate shells, the elongate shells each having an interior surface that defines an elongate cavity, at least one of the elongate cavities having a length that is adequate to accept a portion of an ice fishing rod within the at least one elongate cavity, the ice fishing rod having a tip and a handle, a reel or a line windup attached to the ice fishing rod proximate the handle, the portion of the ice fishing rod extending from a tip of the ice fishing rod to the reel or line windup;
 a first spacing component, the pair of elongate shells each secured by the first spacing component; and
 a second spacing component, at least one of the elongate shells secured by the second spacing component, the second spacing component spaced apart from the first spacing component.

11. The ice fishing tackle storage apparatus of claim 10 wherein:
 the ice fishing tackle storage apparatus is positioned in a container, the container having a wall, the wall having a proximal end and a distal end and the wall having an interior surface; and
 the first spacing component is either in contact with the proximal end of the wall, in contact with the interior surface of the wall, or in contact with both the proximal end of the wall and the interior surface of the wall.

12. The ice fishing tackle storage apparatus of claim 11 wherein:
 the second spacing component is in contact with the interior surface of the wall.

13. The ice fishing tackle storage apparatus of claim 10 wherein the first spacing component comprises a template, the template comprising a plurality of interior surfaces, the interior surfaces defining a plurality of apertures that extend through the template, each elongate shell passing through one of the apertures of the template.

14. The ice fishing tackle storage apparatus of claim 10 wherein the ice fishing tackle storage apparatus is positioned in a container, the container having a wall, the wall comprising one or more interior surfaces that define a recess in the wall or an aperture through the wall, the second spacing component comprising the recess or the aperture, one of the elongate shells passing through the aperture of the wall or positioned in the recess of the wall.

15. The ice fishing tackle storage apparatus of claim 10 wherein the ice fishing tackle storage apparatus is positioned in a container, the container having a wall, the apparatus further comprising a socket, the socket attached to the wall of the container, and one of the elongate shells positioned in the socket.

16. The ice fishing tackle storage apparatus of claim 10 wherein the elongate shells each have a longitudinal axis, a length of at least one of the elongate shells selectively and reversibly adjustable along the longitudinal axis of the at least one elongate shell.

17. The ice fishing tackle storage apparatus of claim 10 wherein the elongate shells each have a cross-sectional shape, the cross-sectional shape selected from the group consisting of cylindrical, square, rectangular, triangular, elliptical, and any of these cross-sectional shapes in any combination.

18. The ice fishing tackle storage apparatus of claim 10 in which a pair of the elongate shells are located adjacent to each other and wherein:
 the first spacing component is effective to keep the adjacent pair of elongate shells in predetermined relation to each other, proximate the first spacing component; or
 the second spacing component is effective to keep the adjacent pair of elongate shells in predetermined relation to each other, proximate the second spacing component.

19. An ice fishing tackle storage apparatus, the apparatus comprising:
 a plurality of elongate shells, the elongate shells each having an interior surface that defines an elongate cavity, and ice fishing tackle capable of being positioned within the elongate cavities of the elongate shells;
 a spacing structure, the elongate shells secured by the spacing structure, the spacing structure effective to maintain two or more of the elongate shells in predetermined relation to each other, proximate the spacing structure;
 wherein at least two of the elongate shells are capable of serving as legs that will stably support the apparatus on a surface when the at least two elongate shells are positioned in contact with the surface, the spacing structure effective to prevent slippage of the at least two elongate shells with respect to the spacing structure; and
 wherein the elongate shells each have a cross-sectional shape, the cross-sectional shape selected from the group consisting of cylindrical, square, rectangular, triangular, elliptical, and any of these cross-sectional shapes in any combination.

20. The ice fishing tackle storage apparatus of claim 19 wherein the ice fishing tackle storage apparatus is positioned in a container, the container having a wall, the wall having a proximal end and a distal end and the wall having an interior surface, the spacing structure either in contact with the proximal end of the wall, in contact with the interior surface of the wall, or in contact with both the proximal end of the wall and the interior surface of the wall.

21. The ice fishing tackle storage apparatus of claim 19 wherein the elongate shells each have a longitudinal axis, a length of at least one of the elongate shells selectively and reversibly adjustable along the longitudinal axis of the at least one elongate shell.

22. An ice fishing tackle storage apparatus, the apparatus comprising:
  a plurality of elongate shells, the elongate shells each having an interior surface that defines an elongate cavity, and ice fishing tackle capable of being positioned within the elongate cavities of the elongate shells;
  a spacing structure, the elongate shells secured by the spacing structure, the spacing structure effective to maintain at least two of the elongate shells in predetermined relation to each other, proximate the spacing structure; and
  a plurality of legs that are capable of supporting the apparatus on a surface when the legs are positioned in contact with the surface, the plurality of legs attached to the spacing structure or to any of the elongate shells.

23. The ice fishing tackle storage apparatus of claim 1 wherein the pair of extendable elongate shells comprise:
  a first extendable elongate shell having a first interior surface that defines a first elongate cavity, the first extendable elongate shell comprising a plurality of separable elongate shell components, each elongate shell component having an inner surface that defines an elongate cavity portion, the elongate cavity portions of each adjacent elongate shell component in communication with each other and the elongate cavity portions collectively forming the first elongate cavity; and
  a second extendable elongate shell having a second interior surface that defines a second elongate cavity.

24. The ice fishing tackle storage apparatus of claim 1 wherein each elongate cavity is selectively and reversibly capable of being lengthened or shortened.

25. The ice fishing tackle storage apparatus of claim 1 wherein the pair of extendable elongate shells are each capable of simultaneously holding different ice fishing tackle items.

26. The ice fishing tackle storage apparatus of claim 25 wherein the different ice fishing tackle items are pre-rigged ice fishing rods, pre-rigged ice-fishing tip-ups, or a pre-rigged ice fishing rod and a pre-rigged ice-fishing tip-up, the ice fishing storage apparatus effective for preventing the different ice fishing tackle items from becoming entangled with each other when held within the extendable elongate shells.

27. The ice fishing tackle storage apparatus of claim 1 wherein each extendable elongate shell comprises an adjustable stop, the adjustable stops effective to hold each extendable elongate shell at a selected level of extension.

28. The ice fishing tackle storage apparatus of claim 1 wherein each extendable elongate shell has a proximal end and a distal end, the proximal end of each extendable elongate shell having a rounded surface that is adequate to minimize abrasion of any fishing line that rests against the proximal end of any extendable elongate shell.

29. An ice fishing rod storage apparatus, the apparatus comprising:
  a pair of elongate shells, the elongate shells each having an interior surface that defines an elongate cavity and ice fishing rods capable of being individually positioned within the elongate cavities of the different elongate shells;
  a first spacing component, the pair of elongate shells each secured by the first spacing component; and
  a second spacing component, at least one of the elongate shells secured by the second spacing component, the second spacing component spaced apart from the first spacing component.

30. The ice fishing rod storage apparatus of claim 29 wherein the ice fishing rods are capable of being individually positioned within the elongate cavities of the different elongate shells with tips of the rods within the elongate cavities and with either the reels or line windups of the ice fishing rods or fishing line extending from the reels or line windups in contact with the elongate shells.

31. An ice fishing tackle storage apparatus, the apparatus comprising:
  a pair of elongate shells, the elongate shells each having an interior surface that defines an elongate cavity and ice fishing tackle capable of being positioned within the elongate cavity of each elongate shell;
  a first spacing component, the pair of elongate shells each secured by the first spacing component; and
  a second spacing component, at least one of the elongate shells secured by the second spacing component, the second spacing component spaced apart from the first spacing component;
  wherein the ice fishing tackle storage apparatus is positioned in a container, the container having a wall, the wall comprising a one or more interior surfaces that define a recess in the wall or an aperture through the wall, the second spacing component comprising the recess or the aperture, one of the elongate shells passing through the aperture of the wall or positioned in the recess of the wall.

32. An ice fishing tackle storage apparatus, the apparatus comprising:
  a pair of elongate shells, the elongate shells each having an interior surface that defines an elongate cavity and ice fishing tackle capable of being positioned within the elongate cavity of each elongate shell;
  a first spacing component, the pair of elongate shells each secured by the first spacing component; and
  a second spacing component, at least one of the elongate shells secured by the second spacing component, the second spacing component spaced apart from the first spacing component;
  wherein the ice fishing tackle storage apparatus is positioned in a container, the container having a wall, the apparatus further comprising a socket, the socket attached to the wall of the container, and one of the elongate shells positioned in the socket.

33. An ice fishing tackle storage system, the ice fishing tackle storage system comprising an ice fishing storage apparatus, the apparatus comprising:
  a pair of elongate shells, the elongate shells each having an interior surface that defines an elongate cavity and ice fishing tackle capable of being positioned within the elongate cavity of each elongate shell; and
  a first spacing component, the pair of elongate shells each secured by the first spacing component; and
  a first wall, the first wall attached to the first spacing component; and a container, the ice fishing tackle storage apparatus positioned in the container, the container having a second wall, the first wall and the second wall defining a chamber within the container, an ice fishing tip-up capable of being placed in the chamber.

34. The ice fishing tackle storage system of claim 33 wherein the ice-fishing tip-up is capable of being entirely within the chamber.

35. An ice fishing tackle storage apparatus, the apparatus comprising:
    a pair of elongate shells, the elongate shells each having an interior surface that defines an elongate cavity and ice fishing tackle capable of being positioned within the elongate cavity of each elongate shell; and
    a first spacing component, the pair of elongate shells each secured by the first spacing component;
    wherein each elongate shell has a proximal end and a distal end, the proximal end of each elongate shell having a rounded surface that is adequate to minimize abrasion of any fishing line that rests against the proximal end of any elongate shell.

36. An ice fishing tackle storage apparatus, the apparatus comprising:
    a pair of elongate shells, the elongate shells each having an interior surface that defines an elongate cavity and ice fishing tackle capable of being positioned within the elongate cavity of each elongate shell; the elongate shells each having both a distal end and a proximal end;
    a first spacing component, the pair of elongate shells each secured by the first spacing component, the first spacing component having a distal surface and a proximal surface; and
    a second spacing component, at least one of the elongate shells secured by the second spacing component, the second spacing component spaced apart from the first spacing component;
    wherein the ice fishing tackle storage apparatus is positioned in a container, the container having a closed bottom end and an open upper end, the first spacing component positioned at the open upper end.

37. The ice fishing tackle storage apparatus of claim 36, wherein the proximal end of at least one of the elongate shells is flush with the proximal surface of the first spacing component.

38. The ice fishing tackle storage apparatus of claim 19 wherein the spacing structure is free of contact with the surface.

39. The ice fishing tackle storage apparatus of claim 19 wherein the spacing structure comprises a template, the template comprising a plurality of interior surfaces, the interior surfaces defining a plurality of apertures that extend through the first template, at least one of the elongate shells passing trough one of the apertures of the template.

40. The ice fishing tackle storage apparatus of claim 22 wherein the spacing structure is free of contact with the surface.

41. The ice fishing tackle storage apparatus of claim 22 wherein the spacing structure comprises a template, the template comprising a plurality of interior surfaces, the interior surfaces defining a plurality of apertures that extend through the first template, at least one of the elongate shells passing through one of the apertures of the template.

42. A bucket assembly, the bucket assembly comprising:
    a bucket, the bucket having a water-holding capacity of at least about three gallons and the bucket having a wall, the wall having a proximal end and a distal end and the wall having an interior surface;
    a plurality of elongate shells, the elongate shells each having an interior surface that defines an elongate cavity and ice fishing tackle capable of being positioned within the elongate cavity of each elongate shell; and
    a first spacing component, the elongate shells each secured by the first spacing component, the first spacing component in contact with the proximal end of the wall, in contact with the interior surface of the wall, or in contact with both the proximal end of the wall and the interior surface of the wall.

43. The ice fishing tackle storage apparatus of claim 19 wherein the elongate shells each have an interior surface that defines an elongate cavity, at least one of the elongate cavities having a length that is adequate to accept a portion of an ice fishing rod within the at least one elongate cavity, the ice fishing rod having a tip and a handle, a reel or a line windup attached to the ice fishing rod proximate the handle, the portion of the ice fishing rod extending from a tip of the ice fishing rod to the reel or line windup.

* * * * *